United States Patent [19]
Lin

[11] Patent Number: 5,948,086
[45] Date of Patent: Sep. 7, 1999

[54] ELECTRONIC STILL CAMERA ADAPTED FOR USE IN THE BATTERY RECEIVING CHAMBER OF A PORTABLE COMPUTER

[75] Inventor: Mao-Yu Lin, Taipei, Taiwan

[73] Assignee: Inventec Corporation, Taipei, Taiwan

[21] Appl. No.: 08/943,893

[22] Filed: Oct. 3, 1997

[51] Int. Cl.⁶ .................................................. G06F 13/00
[52] U.S. Cl. ........................... 710/100; 710/62; 710/102; 248/207; 248/233; 361/600; 361/671; 361/686
[58] Field of Search .................................... 348/207, 552, 348/211, 231, 232, 158, 233; 361/684; 710/100–103

[56] References Cited

U.S. PATENT DOCUMENTS

| | | | |
|---|---|---|---|
| 4,894,792 | 1/1990 | Mitchell et al. | 361/684 |
| 5,402,170 | 3/1995 | Parulski et al. | 348/211 |
| 5,475,441 | 12/1995 | Parulski et al. | 348/552 |
| 5,477,264 | 12/1995 | Sarbadhikari et al. | 348/231 |
| 5,493,335 | 2/1996 | Parulski et al. | 348/233 |
| 5,506,617 | 4/1996 | Parulski et al. | 348/207 |
| 5,754,227 | 5/1998 | Fukuoka | 348/232 |
| 5,768,163 | 6/1998 | Smith, II | 364/705.01 |
| 5,809,520 | 9/1998 | Edwards et al. | 711/115 |
| 5,815,426 | 9/1998 | Jigour et al. | 365/51 |

Primary Examiner—Meng-Ai T. An
Assistant Examiner—Nabil El-Hady
Attorney, Agent, or Firm—Fish & Richardson P.C.

[57] ABSTRACT

An electronic still camera is adapted for use with a portable computer which has a computer housing formed with a battery receiving chamber for receiving removably a battery pack therein, a power supplying device, and a set of first battery charging contacts mounted in the battery receiving chamber for connecting electrically the battery pack to the power supplying device so as to permit recharging of the battery pack when the power supplying device is active, and so as to enable the battery pack to supply electrical power to the portable computer when the power supplying device is inactive. The electronic still camera includes a camera housing having a size and shape conforming to the battery receiving chamber so as to be received removably therein, a rechargeable battery unit for supplying electrical power to the electronic still camera, and a set of second battery charging contacts for contacting the first battery charging contacts when the camera housing is received in the battery receiving chamber so as to permit recharging of the battery unit by the power supplying device when the power supplying device is active.

7 Claims, 4 Drawing Sheets

ELECTRONIC STILL CAMERA ADAPTED FOR USE IN THE BATTERY RECEIVING CHAMBER OF A PORTABLE COMPUTER

BACKGROUND OF THE INVENTION

1. Field of the Invention

The invention relates to an electronic still camera, more particularly to an electronic still camera which is mounted removably in a battery receiving chamber of a portable computer for recharging of a battery unit of the camera and for retrieval of image data in a storage unit of the camera by the computer so as to permit viewing of the image data on a display device of the computer.

2. Description of the Related Art

An electronic still camera generally includes a sensor unit for capturing an image, a processing unit for generating digital image data corresponding to the image captured by the sensor unit, and a storage unit for storing the image data. While the electronic still camera offers the advantage of dispensing with the use of films, the camera has several drawbacks in that charging of a battery unit of the camera is inconvenient to conduct and that an electrical connector unit is needed to interconnect the camera and a computer in order to enable the computer to retrieve image data in the storage unit of the camera for viewing of the image data on a display device of the computer.

SUMMARY OF THE INVENTION

The main object of the present invention is to provide an electronic still camera which is mounted removably in a battery receiving chamber of a portable computer for recharging of a battery unit of the camera.

Another object of the present invention is to provide an electronic still camera which is mounted removably in a battery receiving chamber of a portable computer for retrieval of image data in a storage unit of the camera by the computer so as to permit viewing of the image data on a display device of the computer.

A further object of the present invention is to provide a portable computer which has an electronic still camera mounted removably in a battery receiving chamber thereof for recharging of a battery unit of the camera and for retrieval of image data in a storage unit of the camera by the computer so as to permit viewing of the image data on a display device of the computer.

According to one aspect of the present invention, an electronic still camera is adapted for use with a portable computer which has a computer housing that is formed with a battery receiving chamber for receiving removably a battery pack therein, a power supplying device mounted to the computer housing, and a set of first battery charging contacts mounted to the computer housing in the battery receiving chamber and connected electrically to the power supplying device. The first battery charging contacts connect electrically the battery pack to the power supplying device when the battery pack is received in the battery receiving chamber so as to permit recharging of the battery pack when the power supplying device is active, and so as to enable the battery pack to supply electrical power to the portable computer when the power supplying device is inactive. The electronic still camera comprises:

a camera housing having a size and shape conforming to the battery receiving chamber so as to be adapted to be received removably therein;

a rechargeable battery unit disposed in the camera housing for supplying electrical power to the electronic still camera; and a set of second battery charging contacts mounted on the camera housing and connected electrically to the battery unit, the second battery charging contacts being adapted to contact the first battery charging contacts when the camera housing is received in the battery receiving chamber so as to permit recharging of the battery unit by the power supplying device when the power supplying device is active.

According to another aspect of the present invention, a portable computer includes a computer housing formed with a battery receiving chamber, a battery pack received removably in the battery receiving chamber, a power supplying device mounted to the computer housing, and a set of first battery charging contacts mounted to the computer housing in the battery receiving chamber and connected electrically to the power supplying device. The first battery charging contacts connect electrically the battery pack to the power supplying device when the battery pack is received in the battery receiving chamber so as to permit recharging of the battery pack when the power supplying device is active, and so as to enable the battery pack to supply electrical power to the portable computer when the power supplying device is inactive. The portable computer further comprises an electronic still camera which includes: a camera housing having a size and shape conforming to the battery receiving chamber so as to be received removably therein; a rechargeable battery unit disposed in the camera housing for supplying electrical power to the electronic still camera; and a set of second battery charging contacts mounted on the camera housing and connected electrically to the battery unit, the second battery charging contacts contacting the first battery charging contacts when the camera housing is received in the battery receiving chamber so as to permit recharging of the battery unit by the power supplying device when the power supplying device is active.

The portable computer further comprises a display device mounted on the computer housing, a processing device mounted in the computer housing and connected electrically to the display device, a memory device mounted in the computer housing and connected electrically to the processing device, and a set of first electrical contacts mounted to the computer housing in the battery receiving chamber and connected electrically to the processing device. The electronic still camera further includes a sensor unit mounted in the camera housing for capturing an image, a processing unit mounted in the camera housing and connected electrically to the sensor unit for generating digital image data corresponding to the image captured by the sensor unit, a storage unit mounted in the camera housing and connected electrically to the processing unit for storing the digital image data therein, and a set of second electrical contacts mounted on the camera housing and connected electrically to the processing unit. The second electrical contacts contact the first electrical contacts when the camera housing is received in the battery receiving chamber so as to permit retrieval of the digital image data stored in the storage unit by the processing device for storage in the memory device and for viewing of the captured image corresponding to the digital image data on the display device.

In the disclosed embodiment, the camera housing includes a first housing part, a second housing part and a universal joint which interconnects the first and second housing parts. The electronic still camera further includes a lens unit mounted on the first housing part and associated operably with the sensor unit, and a viewfinding screen mounted on the second housing part and connected operably to the processing unit to permit viewing of the image captured by the sensor unit thereon.

BRIEF DESCRIPTION OF THE DRAWINGS

Other features and advantages of the present invention will become apparent in the following detailed description of the preferred embodiment with reference to the accompanying drawings, of which.

DESCRIPTION OF THE PREFERRED EMBODIMENT

Figure 1:
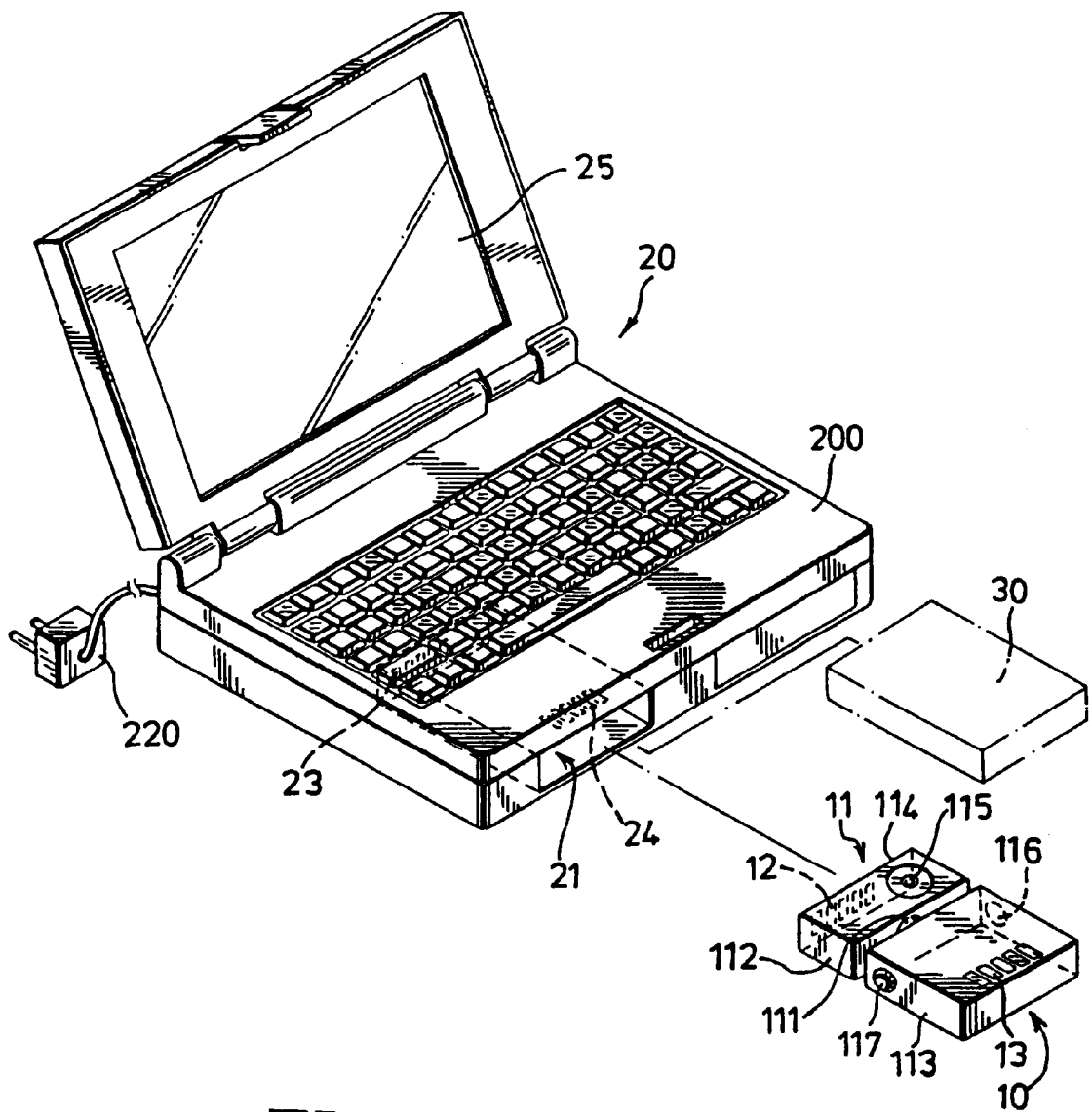
FIG. 1 is an exploded view of the preferred embodiment of a portable computer with an electronic still camera in accordance with the present invention.
Figure 2:
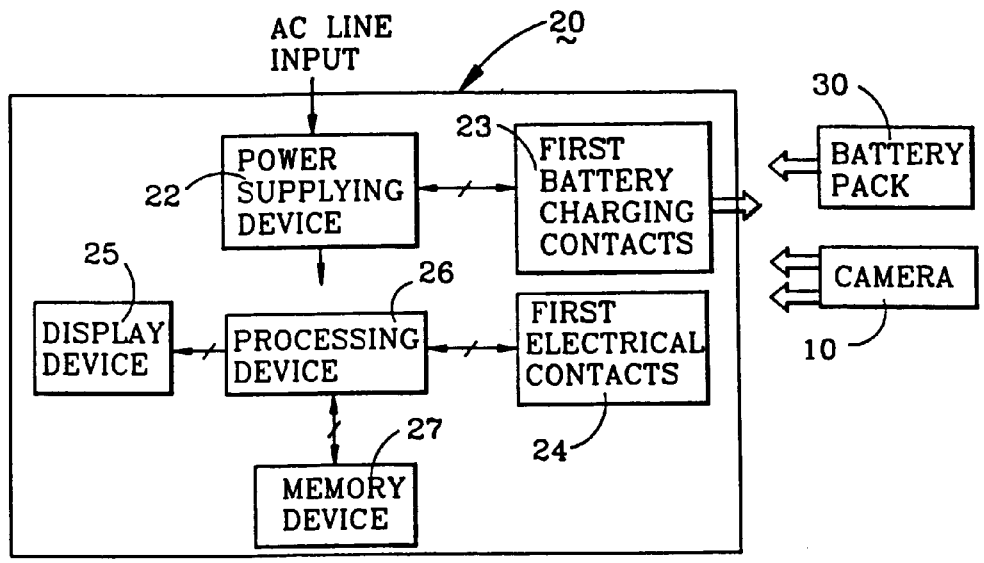
FIG. 2 is a schematic circuit block diagram of the portable computer of the preferred embodiment.
Figure 3:
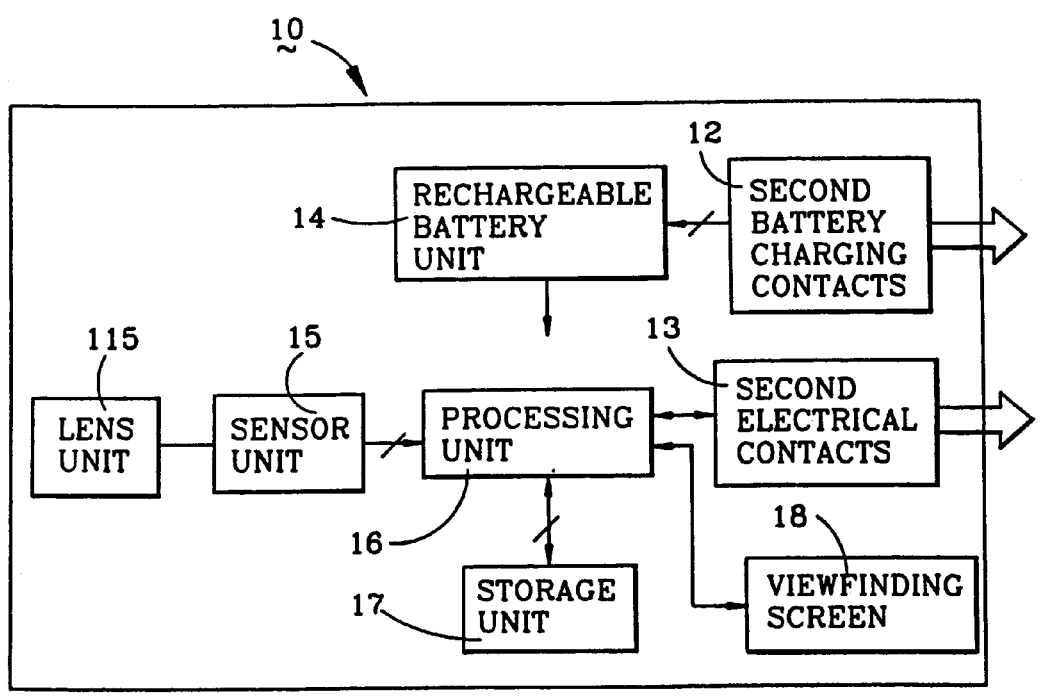
FIG. 3 is a schematic circuit block diagram of an electronic still camera of the preferred embodiment.
Figure 4:
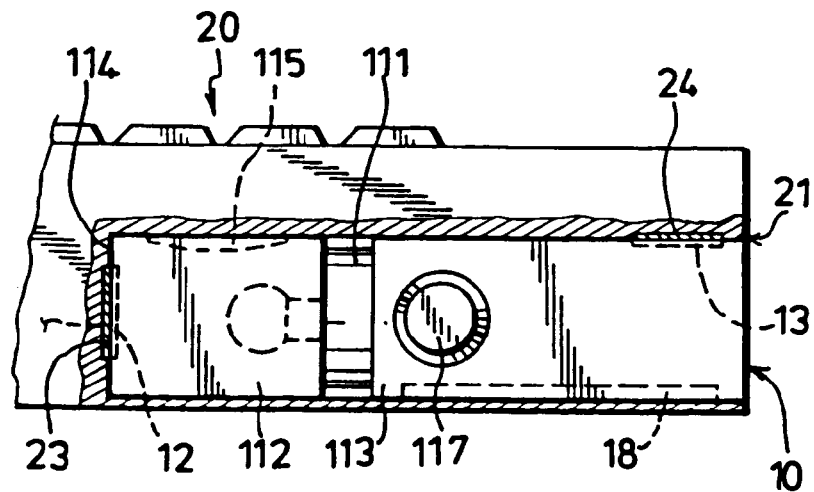
FIG. 4 is a schematic view illustrating the electronic still camera when mounted in a battery receiving chamber of the portable computer in accordance with the present invention.

Referring to FIGS. 1 and 2, the preferred embodiment of a portable computer 20 according to the present invention is shown to comprise a computer housing 200 formed with a battery receiving chamber 21, a battery pack 30 received removably in the battery receiving chamber 21, a power supplying device 22 including an electrical plug 220 which is mounted to the computer housing 200 and which is connectable to an external alternating current (AC) line input, a set of first battery charging contacts 23 mounted to the computer housing 200 in an innermost end of the battery receiving chamber 21 and connected electrically to the power supplying device 22, a display device 25 mounted on the computer housing 200, a processing device 26 mounted in the computer housing 200 and connected electrically to the display device 25, a memory device 27 mounted in the computer housing 200 and connected electrically to the processing device 26, and a set of first electrical contacts 24 mounted to the computer housing 200 on an upper wall of the battery receiving chamber 21 adjacent to an open end of the same and connected electrically to the processing device 26. The first battery charging contacts 23 connect electrically the battery pack 30 to the power supplying device 22 when the former is received in the battery receiving chamber 21 so as to permit recharging of the battery pack 30 when the power supplying device 22 is active, e.g. the electrical plug 220 is connected to the external AC line input, and so as to enable the battery pack 30 to supply electrical power to the various electrical components of the portable computer 20 when the power supplying device 22 is inactive, e.g. the electrical plug 220 is disconnected from the external AC line input.

Referring to FIGS. 1 to 4, the portable computer 20 further comprises an electronic still camera 10 which includes a camera housing 11 that has a size and shape conforming to the battery receiving chamber 21 so as to be received removably therein. The camera housing 11 includes a first housing part 112, a second housing part 113 and a universal joint 111 which interconnects the first and second housing parts 112, 113. A rechargeable battery unit 14 is disposed in the camera housing 11 for supplying electrical power to the various electrical components of the camera 10. A set of second battery charging contacts 12 is mounted on an end face 114 of the first housing part 112 and is connected electrically to the battery unit 14. The second battery charging contacts 12 contact the first battery charging contacts 23 when the camera housing 11 is received in the battery receiving chamber 21 so as to permit recharging of the battery unit 14 by the power supplying device 22 when the power supplying device 22 is active.

The electronic still camera 10 further includes a sensor unit 15 mounted in the camera housing 11 for capturing an image, a lens unit 115 mounted on the first housing part 112 and associated operably with the sensor unit 15 in a conventional manner, a processing unit 16 mounted in the camera housing 11 and connected electrically to the sensor unit 15 for generating digital image data corresponding to the image captured by the sensor unit 15, a storage unit 17 mounted in the camera housing 11 and connected electrically to the processing unit 16 for storing the digital image data therein, and a set of second electrical contacts 13 mounted on one side of the second housing part 113 and connected electrically to the processing unit 16. The second electrical contacts 13 contact the first electrical contacts 24 when the camera housing 11 is received in the battery receiving chamber 21 so as to permit retrieval of the digital image data stored in the storage unit 17 by the processing device 26 in a known manner for storing the same in the memory device 27 and for viewing the captured image corresponding to the digital image data on the display device 25.

A viewfinding screen 18 is mounted on one side of the second housing part 113 and is connected electrically to the processing unit 16 to permit viewing of the image captured by the sensor unit 15 thereon. A focus adjustment button 116 for adjusting the focusing of the captured image, and a shutter button 117 for controlling the image capturing operation are also mounted on opposite side walls of the second housing part 113.

Figure 5:
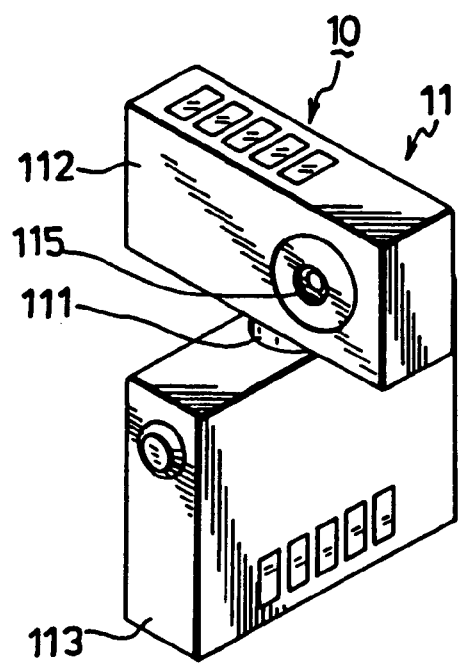
FIGS. 5, 6 and 7 are perspective views of the electronic still camera of the preferred embodiment.
Figure 6:
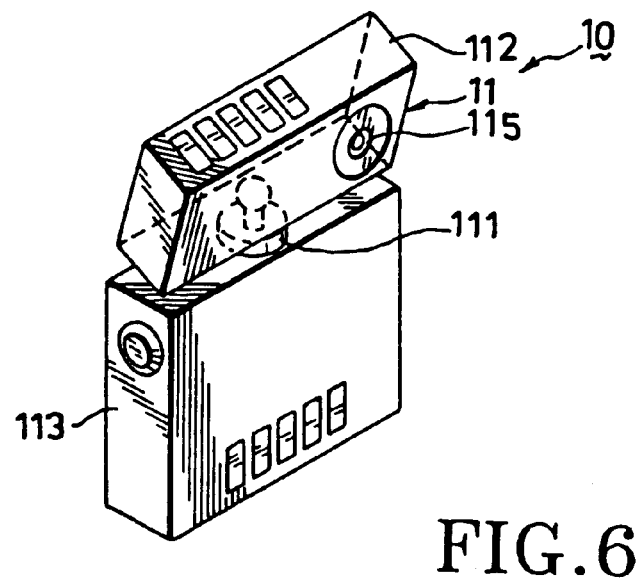
Figure 7:
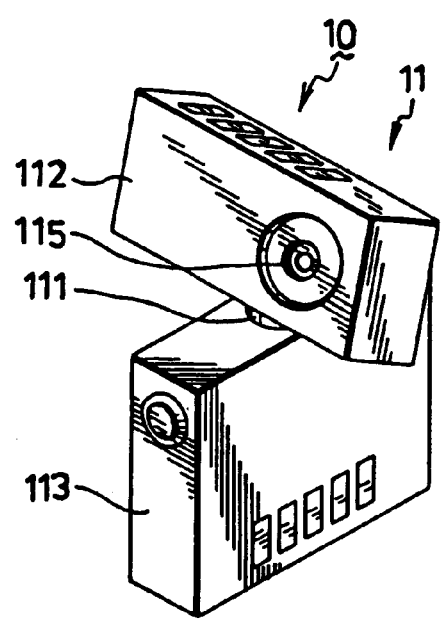

Referring to FIGS. 5, 6 and 7, due to the presence of the universal joint 111, the first housing part 112 can be rotated to different angles relative to the second housing part 113 in order to facilitate capturing of a desired image by the sensor unit 15 (see FIG. 3) via the lens unit 115 on the first housing part 112.

It has thus been shown that the portable computer 20 with the electronic still camera 10 of the present invention facilitates charging of the battery unit 14 of the camera 10 and obviates the need for an additional electrical connector unit to establish electrical connection between the camera 10 and the computer 20. Moreover, capturing of a desired image is is facilitated due to the universal joint 111 between the housing parts 112, 113 of the camera housing 11.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. An electronic still camera adapted for use with a portable computer, the portable computer has a computer housing that is formed with a battery receiving chamber for receiving removably a battery pack therein, a power supplying device mounted to the computer housing, a set of first battery charging contacts mounted to the computer housing in the battery receiving chamber and connected electrically to the power supplying device, the first battery charging contacts connecting electrically the battery pack to the power supplying device when the battery pack is received in the battery receiving chamber so as to permit recharging of the battery pack when the power supplying device is active, and so as to enable the battery pack to supply electrical power to the portable computer when the power supplying device is inactive, the portable computer further having a processing device mounted in the computer housing, and a set of first electrical contacts mounted to the computer housing in the battery receiving chamber and connected electrically to said processing device, said electronic still camera comprising:

a camera housing having a size and shape conforming to the battery receiving chamber of the portable computer so as to be adapted to be received removably therein;

a rechargeable battery unit disposed in said camera housing for supplying electrical power to the electronic still camera; and a set of second battery charging contacts mounted on said camera housing and connected electrically to said battery unit, said second battery charging contacts being adapted to contact the first battery charging contacts mounted to the computer housing when said camera housing is received in the battery receiving chamber of the portable computer so as to permit recharging of said battery unit by the power supplying device when the power supplying device is active;

a processing unit mounted in said camera housing, and a set of second electrical contacts mounted on said camera housing and connected electrically to said processing unit, said second electrical contacts being adapted to contact the first electrical contacts mounted on the portable computer housing when said camera housing is received in the battery receiving chamber of the portable computer.

2. The electronic still camera of claim 1, adapted for use with a portable computer, the portable computer further having a display device mounted on the computer housing, and wherein the processing device mounted in the computer housing is connected electrically to the display device, a memory device mounted in the computer housing and connected electrically to the processing device, wherein the electronic still camera further comprises:

a sensor unit mounted in said camera housing for capturing an image;

wherein the processing unit mounted in said camera housing is connected electrically to said sensor unit for generating digital image data corresponding to the image captured by said sensor unit;

a storage unit mounted in said camera housing and connected electrically to said processing unit for storing the digital image data therein; and wherein the set of second electrical contacts mounted on said camera housing and connected electrically to said processing unit, said second electrical contacts being adapted to contact the first electrical contacts mounted to the computer housing when said camera housing is received in the battery receiving chamber of the portable computer so as to permit retrieval of the digital image data stored in said storage unit by the processing device of the portable computer for storage in the memory device of the portable computer and for viewing of the captured image corresponding to the digital image data on the display device of the portable computer.

3. The electronic still camera of claim 2, wherein said camera housing includes a first housing part, a second housing part and a universal joint which interconnects said first and second housing parts, said electronic still camera further comprising a lens unit mounted on said first housing part and operationally connected with said sensor unit, and a viewfinding screen mounted on said second housing part and operationally connected to said processing unit to permit viewing of the image captured by said sensor unit thereon.

4. A portable computer including a computer housing formed with a battery receiving chamber, a battery pack received removably in said battery receiving chamber, a power supplying device mounted to said computer housing, a set of first battery charging contacts mounted to said computer housing in said battery receiving chamber and connected electrically to said power supplying device, said first battery charging contacts connecting electrically said battery pack to said power supplying device when said battery pack is received in said battery receiving chamber so as to permit recharging of said battery pack when said power supplying device is active, and so as to enable said battery pack to supply electrical power to said portable computer when said power supplying device is inactive, the portable computer further having a processing device mounted in the computer housing, and a set of first electrical contacts mounted to the computer housing in the battery receiving chamber and connected electrically to said processing device, wherein the improvement comprises:

an electronic still camera including: a camera housing having a size and shape conforming to said battery receiving chamber of the portable computer so as to be received removably therein; a rechargeable battery unit disposed in said camera housing for supplying electrical power to the electronic still camera; a set of second battery charging contacts mounted on said camera housing and connected electrically to said rechargeable battery unit, said second battery charging contacts contacting said first battery charging contacts mounted to the computer housing when said camera housing is received in said battery receiving chamber of the portable computer so as to permit recharging of said battery unit by said rechargeable power supplying device when said power supplying device of the portable computer is active, a processing unit mounted in said camera housing; and a set of second electrical contacts mounted on said camera housing and connected electrically to said processing unit, said second electrical contacts contacting said first electrical contacts mounted on the portable computer housing when said camera housing is received in said battery receiving chamber of the portable computer.

5. The portable computer of claim 4, further comprising a display device mounted on said computer housing, and wherein the processing device mounted in said computer housing is a connected electrically to said display device, a memory device mounted in said computer housing and connected electrically to said processing device.

6. The portable computer of claim 5, wherein said electronic still camera further comprises:

a sensor unit mounted in said camera housing for capturing an image;

wherein the processing unit mounted in said camera housing is connected electrically to said sensor unit for generating digital image data corresponding to the image captured by said sensor unit;

a storage unit mounted in said camera housing and connected electrically to said processing unit for storing the digital image data therein; and wherein the set of second electrical contacts mounted on said camera housing and connected electrically to said processing unit, said second electrical contacts contacting said first electrical contacts mounted to the computer housing when said camera housing is received in said battery receiving chamber of the portable computer so as to permit retrieval of the digital image data stored in said storage unit by said processing device for storage of the portable computer in said memory of the portable computer device and for viewing of the captured image corresponding to the digital image data on said display device of the portable computer.

7. The portable computer of claim 6, wherein said camera housing includes a first housing part, a second housing part and a universal joint which interconnects said first and second housing parts, said electronic still camera further including a lens unit mounted on said first housing part and operationally connected with said sensor unit, and a viewfinding screen mounted on said second housing part and operationally connected to said processing unit to permit viewing of the image captured by said sensor unit thereon.

* * * * *